V. F. PAVEY.
CORN PLANTER.
APPLICATION FILED AUG. 4, 1908.

925,375.

Patented June 15, 1909.

WITNESSES:

INVENTOR:
Vernon F. Pavey
by
Geo. W. Rightmire
Attorney.

UNITED STATES PATENT OFFICE.

VERNON F. PAVEY, OF LEESBURG, OHIO.

CORN-PLANTER.

No. 925,375.     Specification of Letters Patent.     Patented June 15, 1909.

Original application filed January 18, 1908, Serial No. 411,516. Divided and this application filed August 4, 1908. Serial No. 446,870.

*To all whom it may concern:*

Be it known that I, VERNON F. PAVEY, a citizen of the United States, residing at Leesburg, in the county of Highland and State of Ohio, have invented certain new and useful Improvements in Corn-Planters, of which the following is a specification.

My invention relates to improvements in corn planters, and especially refers to a marker adapted to be arranged upon the drive wheel of a planter, whereby the location of the seed hill is indicated for the purpose of enabling the operator to plant the field in rows having the hills in a straight line in either direction across the field, so that the grain may be readily cultivated in both directions.

I contemplate the application of my improved marker to a corn planter such as is shown and described in my pending application, Serial No. 411,516, filed January 18, 1908, and of which application the present one is a division.

My invention further consists in the provision of a marker which may be pivotally connected with the tripping device for the dropper, and may therefore be located around the circumference of the wheel as desired.

Figure 1:
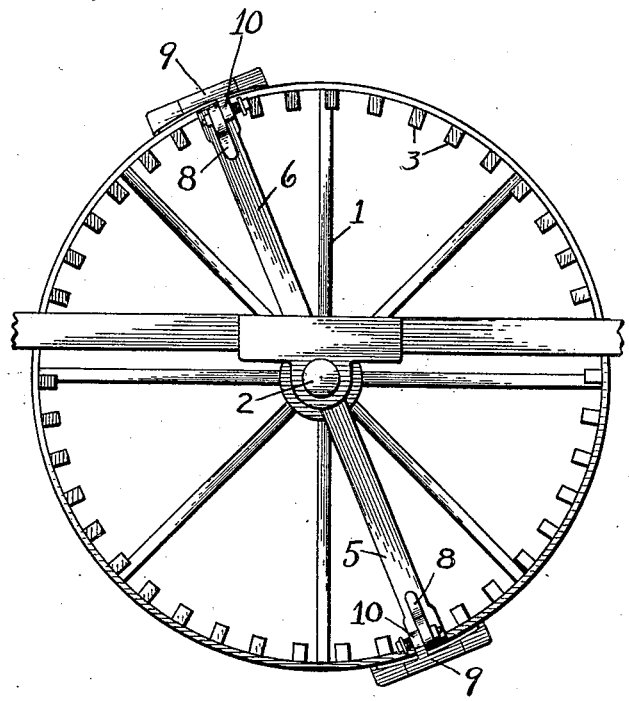
Figure 2:
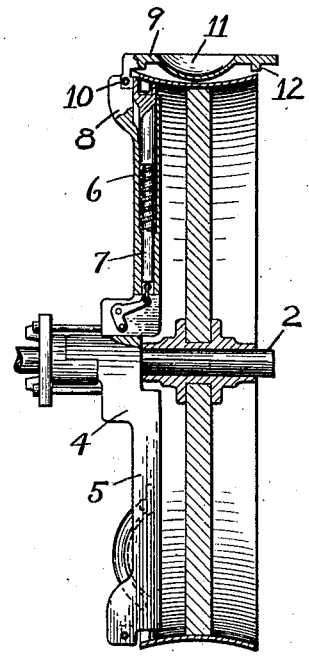
Figure 3:
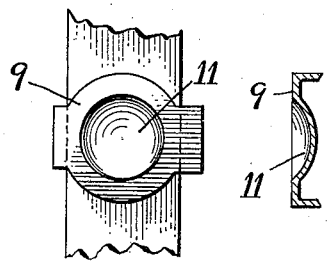

Referring to the drawing which is hereto attached and hereby made a part of this specification, Figure 1 is a side elevation of a wheel having my improved marker thereon in place; Fig. 2 is a vertical transverse section through the wheel at the axle, showing the marker in section in place, and out of position in dotted lines; Fig. 3 is a plan view of the marker and a cross section of the same at a right angle to the axis of the wheel.

In the drawings in which the same numeral indicates the same part throughout, 1 is a driving wheel of a corn planter detached therefrom, mounted upon the axle 2, and provided around the inner face of the rim with the teeth or lugs 3; mounted upon the axle 2 is the tripping device 4 having the radial arms 5 and 6; additional arms may be provided if desired. Each arm of the tripping device is provided with the spring actuated lever controlled rod 7, bifurcated at its outer end, for the purpose of engaging the teeth or lugs 3, whereby the tripping device 4 is coupled to the wheel to rotate therewith. At its outer end the tripping device is prefer- ably formed with a head or enlargement 8, which is located opposite to the wheel rim; the marker 9 is constructed to be pivoted or hinged upon the head 8 at 10, so that it may be swung to occupy a position on the wheel as shown in Figs. 1 and 2, and also that it may be swung outwardly off of the wheel rim as shown in dotted lines in Fig. 2. The marker 9 is formed with a cup shaped depression 11 therein.

After the seeds are dropped, the earth is moved thereover from both sides of the furrow by the tire face of the rim, which is formed with a circumferential channel or depression therein, this formation operating to drive the earth inwardly along the beveled surface of the tire face of the rim as the planter moves forward. This operation covers the seed, and the marker being pressed against the soft earth where the seed lies covered by the rotation of the wheel, will leave an inverted cup shaped hill, which is large enough to be readily seen by the operator over a distance comprising the width of several rows. The operator may therefore readily position the dropper and marker so that the hills in the row about to be planted will be in the straight lines joining the hills across the field. This manipulation or changing of the marker will probably have to be made at the beginning of each journey across the field and at any turn made around trees or stumps, and it is seen that it will be easy to position the marker so that the hills of grain to be planted in any particular journey across the field will be in alinement with those which have been planted in the preceding rows.

At 12 I show a means of fastening the free end of the marker to the wheel when it has been positioned thereon; spring means or pin means or any other desired means may be utilized for this purpose, the chief object being to provide means which will permit the ready attachment and detachment of the marker.

The form of the marker may be varied and the manner of attaching the same may also be subject to change; my invention chiefly comprises the construction of a readily manipulated marker which may be attached to the tripper and be moved thereon into and out of position. I do not limit myself to the specific form of construction shown and described, therefore, but desire to claim all modifications which are within the spirit of my invention.

What I claim is;

1. In a corn planter having a dropper tripping device adapted to be coupled to the driving wheel, a marking device pivotally connected with said tripping device and adapted to be arranged upon the outer face of the wheel rim and to be disconnected therefrom as desired.

2. In a corn planter having a dropper tripping device adapted to be coupled to the driving wheel, a marking device pivotally mounted upon said tripping device and adapted to be arranged upon the outer face of the wheel rim and to be removed therefrom as desired, and being formed with a cup shaped depression whereby the earth is molded into an inverted cup shaped form after the seed has been planted.

3. In a corn planter having a wheel actuated dropper tripping device, a marking device for alining the seed hills, comprising a shallow cup shaped member pivoted upon said tripping device and adapted to be swung into position upon the outer face of the wheel rim and secured thereon and to be swung out of position by the operator as desired.

In testimony whereof I affix my signature in the presence of two witnesses.

VERNON F. PAVEY.

Witnesses:
C. E. PAVEY,
I. E. DAVIS.